Patented Nov. 19, 1946

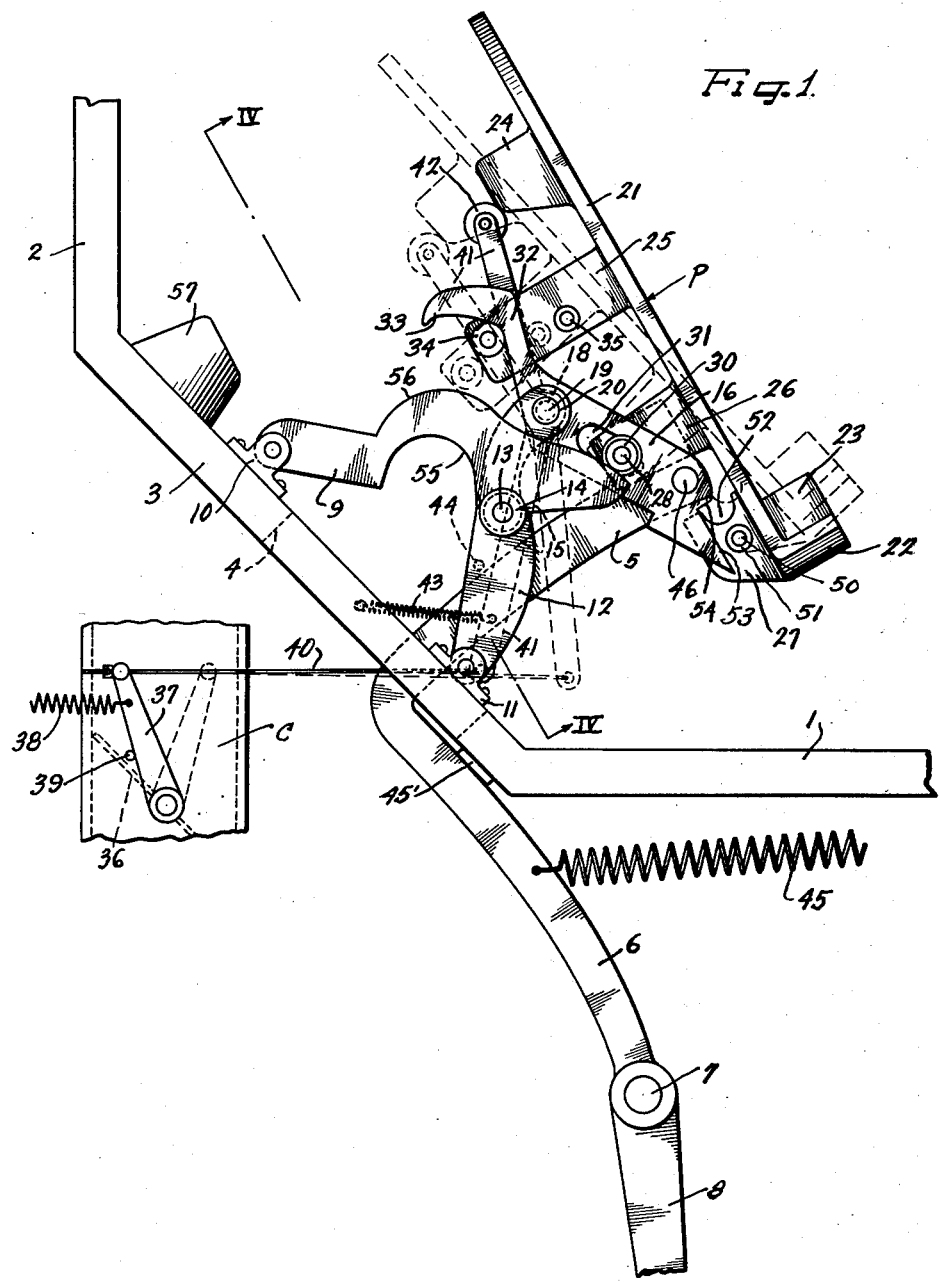

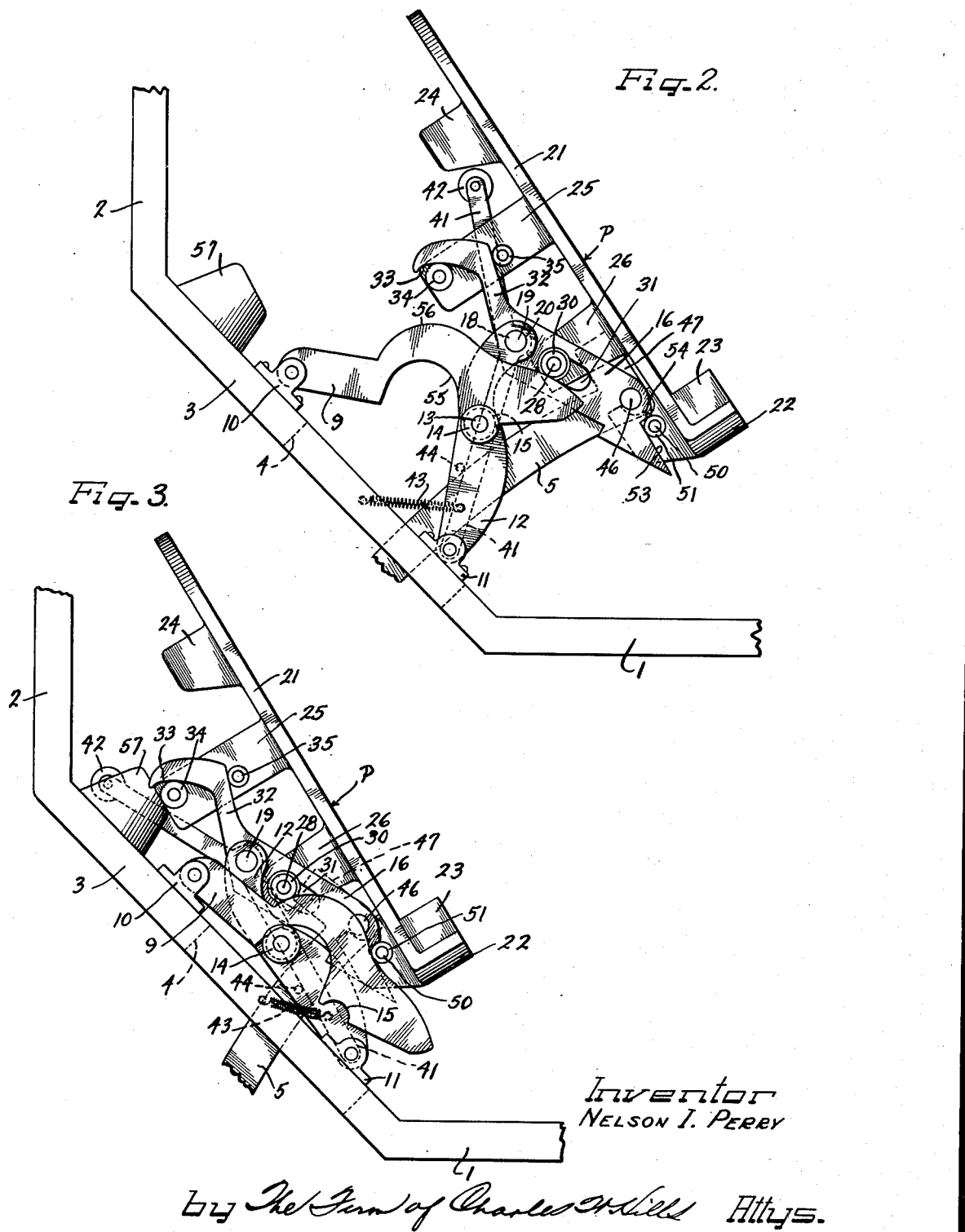

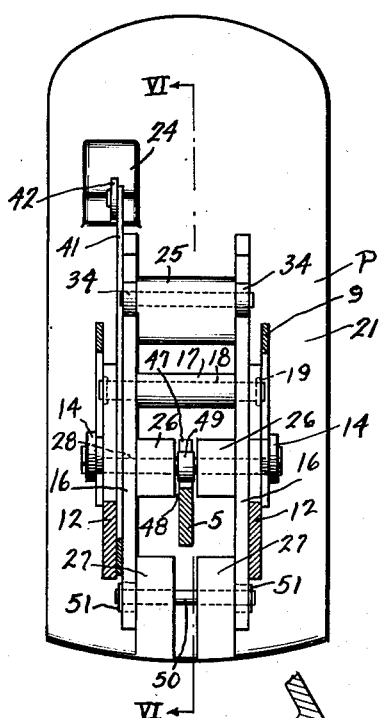
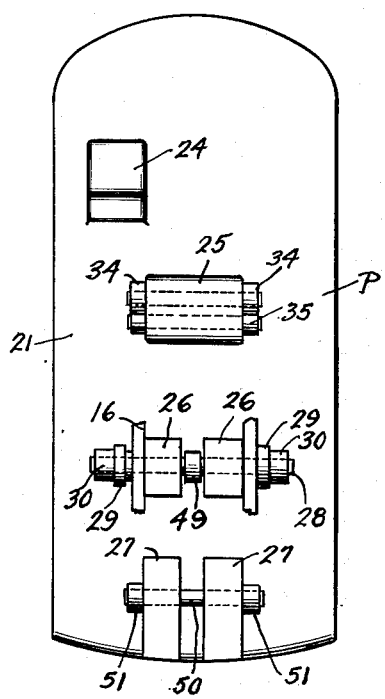
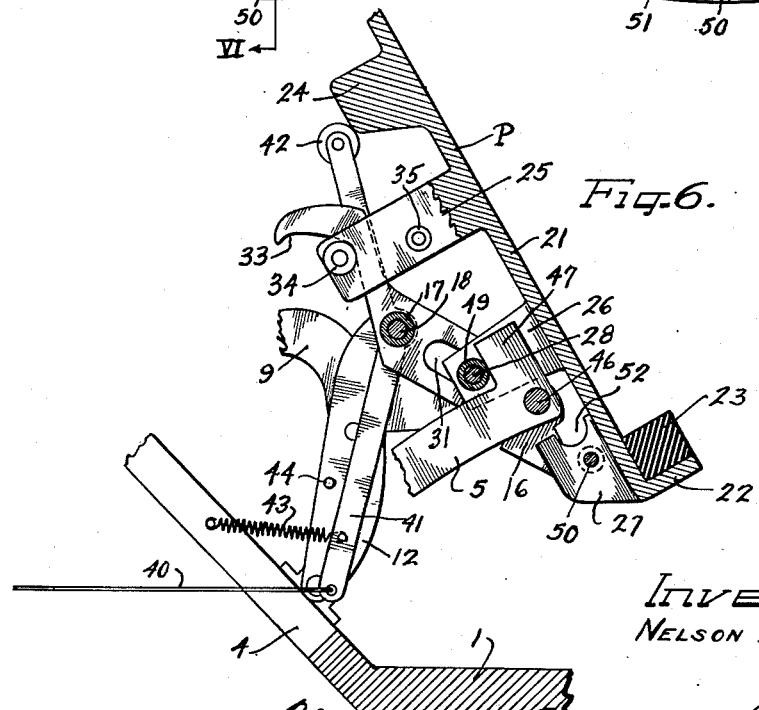

2,411,167

UNITED STATES PATENT OFFICE 2,411,167

COMBINED FOOT BRAKE AND ACCELERATOR

Nelson I. Perry, Chicago, Ill.

Application February 5, 1945, Serial No. 576,259

8 Claims. (Cl. 192—3)

My invention relates to combined foot brake and accelerator control structure for motor vehicles, the object, in general, being to provide improved structure by which the engine throttle and brake may be selectively operated by different movement of a single foot pedal.

More in detail, an important object of the invention is to provide a combined foot brake and accelerator operating structure in which swing of the foot pedal by toe operation will control the acceleration, and bodily forward movement of the foot pedal by foot pressure will control the braking.

A further object is to provide structure with which, when the foot pedal is swung by toe operation for acceleration control, brake operation will be locked out and, vice versa, when the foot pedal is bodily shifted forwardly by foot pressure for brake operation, swing of the pedal is prevented and acceleration control is locked out.

Another object is to provide a support for the foot pedal in the form of a linkage which is normally extended to provide a fulcrum for toe swing of the pedal for acceleration control, and which forms trackage for the foot pedal and folds up with the bodily forward movement of the foot pedal by heel or full forward foot pressure thereagainst, for operation of the brake lever for braking of the vehicle.

Still another object is to provide a double-sided linkage assembly for supporting the foot pedal to hold it rigid against side movement or sway during acceleration or braking control and to prevent vibration of the foot pedal and the supporting structure during running of the vehicle.

Still another object is to provide a supporting linkage having connection with an accelerator lever and a brake lever and so functioning that, when the foot pedal is rocked for movement of the accelerator lever, the brake lever will be locked against movement, and when forward thrust is exerted against the foot pedal by the entire foot or the heel, the resulting bodily movement of the foot pedal will first cause lock-out of the accelerator lever from operation and then swing of the brake lever for brake setting.

The above and other features of my invention are shown embodied in the structure illustrated on the drawings, in which drawings Figure 1 is a side elevation of the foot brake and accelerator control assembly mounted in an automotive vehicle showing, in full lines, the various parts in normal position, and the dotted lines showing the operation of the foot pedal for acceleration control;

Figure 2 is a view similar to Figure 1 showing the preliminary bodily movement of the foot pedal for locking the foot pedal against acceleration operation rocking movement before operation of the brake lever during final bodily forward movement of the foot pedal;

Figure 3 is a view similar to Figure 1 but showing the foot pedal at the end of its final bodily movement for actuating the brake arm for brake setting;

Figure 4 is a section on plane IV—IV Figure 1;

Figure 5 is a rear elevation of the foot pedal; and

Figure 6 is a section on plane VI—VI Figure 4.

On the drawings, 1 indicates a portion of the floor board of a vehicle between the front end of which and the dashboard 2 extends the inclined porton 3 of the floor which has therethrough a passageway 4 through which the arm 5 of the brake lever 6 extends, which brake lever is secured to a shaft 7 from which arms 8 extend for connection with the brakes to be controlled. Between the foot pedal P and the floor portion 3 extends supporting and operating linkage on which the pedal may be rocked for accelerator operation, and on which it may move bodily in response to direct forward foot pressure thereagainst to swing the brake lever for brake operation.

The linkage comprises a pair of cam rail plates 9 fulcrumed at their front ends to brackets 10 on the floor board 3 above and at opposite sides of the passageway 4. Near the lower end of the passage 4 and at opposite sides thereof brackets 11 fulcrum supporting levers 12 which, when the linkage is in normal position as shown on Figure 1, extend upwardly just inside of the cam rail plates 9 and have pins 13 extending outwardly therefrom for journalling rollers 14 which engage in the semi-circular bearing recesses or dwells 15 in the under edges of the cam rails 9 to support these members. Engaging against the inner sides of the upper ends of the supporting levers 12 are guide members or plates 16 between which is interposed a spacer sleeve 17 through which extends a pin 18 which continues through the members 16 and the levers 12 and terminates in heads 19 engaging in countersunk recesses 20 in the outer sides of the levers 12.

Describing now the foot pedal, it may be in the form of an integral casting comprising the foot plate 21 having a forwardly extending flange 22 at its lower or heel end for mounting a heel rest 23 which may be of rubber. On its rear or under side and near the top thereof the plate has a cam lug 24. Below this cam lug is a second lug 25 below which are the spaced apart lugs 26, and near the lower end of the plate are the spaced apart lugs 27. Extending through the lugs 26 near the ends thereof is a pin 28 which, just outside of the lugs, journals rollers 29 and outside of these rollers journals the rollers 30. The guide plate members 16 engage at their inner sides against the outer sides of the lugs 26 and have longitudinally elongated and inclined guide passageways or slots 31 therethrough rearwardly of their pivot connections with the supporting levers 12, these passageways receiving the rollers 29 engageable with the upper and lower edges of the passageways. The outer rollers 30 engage the upper edges of the cam rail members 9.

At their forward ends, the guide members 16 have upwardly extending necks 32 terminating in angularly extending beaks 33. On opposite sides of the lugs 25 are front and rear abutments 34 and 35 which may be in the form of rollers and between which the necks 32 of the guide members 16 extend with the beak ends 33 above the front abutments 34. When the linkage assembly between the foot pedal and the floor board is in normal position, as shown on Figure 1, the rollers 29 will be at the lower ends of the inclined passageways 31 in the guide members 16, the pin 28 forming a fulcrum for forward swing of the pedal for acceleration setting, such forward swing being limited by the engagement of the rear abutments 35 with the necks 32. When the pedal is released after acceleration operation, spring means, to be referred to hereinafter, will swing the pedal to its normal position with the stops 34 thereon against the necks 32 on the members 16, as shown on Figure 1.

For controlling the acceleration of the vehicle engine, a carburetor C is diagrammatically shown having the throttle valve 36 from whose supporting shaft extends a lever 37 engaged by a spring 38 which tends to hold the lever against a stop 39 for closure of the throttle valve. This lever is connected by a rod 40 with the lower end of the acceleration control lever 41 which extends upwardly between one of the levers 12 and the adjacent guide member 16 to be fulcrumed intermediate its ends on the pin 18, the lever at its upper end journalling a roller 42 for cooperation with the cam lug 24 on the foot pedal plate. The full lines on Figure 1 show the various parts in normal position, the throttle valve being closed, the rollers 29 on the pedal fulcruming pin 28 being at the rear or lower ends of the passageways or slots 31, and the rollers 30 on the pin 28 being in engagement with the top edges of the cam rails 9 at the rear ends thereof. The cam roller 42 on the acceleration control lever 41 is near the rounded corner of the cam lug 24 and when the foot pedal is rocked rearwardly, i. e., to the left as shown in Figure 1 as indicated by the dotted lines, Fig. 1, the acceleration lever 41 will swing on the pin 18 to be operated for opening of the throttle valve for the desired acceleration. During swing of the foot pedal for acceleration operation, the roller 42 is held against the cam lug by a spring 43 extending between the lower floor board 3 and the lever 41 and when the foot pedal is released, the spring will rock the lever back for return thereby of the pedal to normal position. During rocking of the lever 41 on the fulcrum pin 18 the end of the lever below this fulcrum moves along the inner side of the adjacent supporting lever 12, and on this lever 12 just forwardly of the lower end of the lever 41 is a stop 44.

As will be explained more in detail later, the brake lever 6 is operated by straight forward push against the foot pedal, and during the fore part of such forward movement the rollers 29 on the fulcrum pin 28 for the foot pedal move up the inclined slots or passageways 31, this movement effecting sufficient longitudinal upward movement of the foot pedal to withdraw the cam lug 24 out of the path of the roller 42 so that the lever 41 will be free to be swung by the spring 43 against the stop 44, and then the point of connection of the lower end of the lever with the rod 40 extending from the throttle valve will be in the fulcrum axis for the lower ends of the supporting levers 12. Continued forward bodily movement of the foot pedal for rocking the brake lever for setting of the brakes will embody rocking of the support levers 12 forwardly and the lever 41 will move with the fulcrum pin 18 extending through the upper ends of the levers 12, and as the lower end of the lever 41 is in the fulcrum axis on which the levers 12 swing, there will be no movement by the lever 41 of the rod 40 extending therefrom to the carburetor. Thus, during movement of the foot pedal for brake setting, the acceleration operation is locked out and the carburetor throttle valve remains closed.

Describing now the braking operation, a spring 45 tends to hold the brake lever normally against a stop 45' on the front side of the floor board 3. The rear end of the upper arm 5 on the brake lever receives a pin 46 which extends between and is fulcrumed in the rear ends of the guide member 16, a finger 47 extending upwardly from the fulcrum end of the arm 5 and into space 48 between the lugs 26 on the foot pedal, this finger being normally behind a roller 49 journalled on the pin 28 in the space between the lugs 26, as best shown on Figure 5.

A pin 50 extends through the lugs 27 at the lower end of the foot pedal, the ends of the pin supporting rollers 51. In the upper sides of the lugs 27 are semi-circular recesses on notches 52. The rear ends of the guide members 16 are cut out to provide the inclined surfaces 53 and shoulders 54. As shown on Figure 1, when the entire assembly is in normal position, the rollers 51 are displaced from the shoulders 54 and from the surfaces 53, the rollers 29 being at the lower ends of the passageways or guide slots 31 in the guide members 16 and the rollers 30 being in engagement with the rear ends of the top surfaces of the guide rails 9 which rest with their notches 15 on the rollers 14 on the support levers 12. During this normal position of the assembly, the finger 47 on the brake lever arm 5 is behind the roller 49 between the lugs 26 so that, should the brake lever spring 45 break or become detached, the brake lever will be held from swinging down. Also during such normal condition of the assembly, the force of the spring 43 will hold cam roller 42 against the cam lug 24 to hold the foot pedal swung rearwardly with the forward rollers 34 on the lug 25 in engagement with the front sides of the necks 32 of the guide members 16. Furthermore, the roller 49 by being in front of the brake lever finger 47 will lock the brake lever against operation while the foot pedal is being operated for acceleration control.

When it is now desired to brake, direct forward pressure is exerted by the entire foot against the foot pedal for bodily movement thereof. During the forepart of such bodily movement the rollers 30 will travel forwardly along the upper edge of the cam rails 9 while the rollers 29 will travel to the forward end of the guide passages 31 in the members 16, and the rear abutment rollers 35 on the lug 25 will abut against the rear sides of the upper ends of the necks 32 while the forward abutment rollers 34 will abut against the undersides of the beaks 33 near the forward ends thereof. Also during this preliminary bodily movement of the foot pedal the recesses 52 in the lugs 27 will receive the pin 46 on the brake lever arm 5 and the roller 49 between the lugs 26 will be moved up past the finger 47 on the brake lever arm 5, as shown on Figure 3. When the pin 46 is received in the recesses 52, the end of the lever arm 5 will be received in the space between the lugs 27. After this preliminary bodily movement of the foot pedal under forward pressure by the foot, the brake lever will be free for swing for brake setting, but the foot pedal will be locked against swing on its fulcrum rollers, and acceleration is locked out in the manner already described. Now, during continued forward foot pressure against the foot pedal after the preliminary movement thereof, the support levers 12 will be rocked forwardly on their lower end fulcrums and the brake lever will be rocked for brake setting, the rollers 14 on the levers 12 leaving the notches 15 in the cam rail members 9 and engaging against the curved lower edge surfaces 55 of the cam rail members, while the rollers 30 on the pin 28 engage with the curved upper edge surfaces 56 of the cam rail members, which rail members will thus guide the brake setting bodily movement of the members 16 and the foot pedal. The forward brake setting movement of the foot pedal is limited by the engagement of the lug 25 with a stop 57 which is preferably a rubber piece secured to the foot board 3. During the entire brake setting movement of the foot pedal, the lower end of the accelerator lever 41 is in alinement with the fulcrum axis of the levers 12 so that the levers 12 and the accelerator lever will swing together on a common fulcrum axis so as to prevent any operation of the acceleration during the brake setting operation. During the preliminary movement of the foot pedal from normal position the roller 49 will be carried up past the front side of the finger 47 on the brake lever arm 5, and then, as soon as the final brake setting movement of the foot pedal is started and the brake lever is swung, the upper side of the finger will come below the roller so as to hold the foot pedal with its rollers 29 at the front or upper ends of the guide passages 31 to prevent reverse movement of the foot pedal. As soon as the forward foot pressure against the pedal is released, the brake lever under pull of the spring 45 will return the linkage to normal position and the finger 47 will be moved away from under the roller 49 so that the foot pedal may return to its normal position with the rollers 29 at the rear ends of the guide passages 31.

The control assembly can be applied as a unit to an automotive vehicle, and by having a double linkage as shown, that is, two sets of levers and guide members spaced apart, a secure support free from side motion is provided for the foot pedal and the structure will not vibrate. The various linkage members and the brake lever and foot pedal are so interlocked at all times that the structure will not collapse should the brake lever spring become broken or fail. The structure is so arranged that the foot pedal will be at a sufficient height to comfortably support the driver's leg by the heel, and the distance of the foot pedal plate from the driver is such that when the foot is resting thereon, the knee will be slightly bent. Then for acceleration, the foot alone is swung forwardly for corresponding swing of the foot pedal on its fulcrum for acceleration control, and then when the knee is straightened the resulting forward foot pressure against the foot pedal will be sufficient to bodily shift the pedal for brake setting. During acceleration operation the braking operation is automatically locked out and, during braking operation, the acceleration is automatically locked against operation so that at no time can there be acceleration and braking at the same time. In ordinary control systems in automobiles, where a separate accelerator pedal and a separate brake pedal are provided, the time lost in moving the foot from the accelerator pedal to the brake pedal may be sufficient for the occurrence of accidents. With my improved structure, where one foot pedal may be operated for either acceleration or braking, there is no need to move the foot, and the time saved between acceleration cut-off and braking will many times avoid accidents.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a motor vehicle having brake and throttle controls, an expansible and retractable linkage fulcrumed on the foot board of the vehicle and having connection with said controls, a foot pedal fulcrumed on said linkage for swing for operation of the throttle control and normally disconnected from the brake control, means holding said linkage against retraction while said throttle control is being operated, said foot pedal being bodily movable forwardly on said linkage, means effective during the initial bodily forward movement of said pedal to lock said pedal against swing for throttle control and to release said linkage for retraction thereof, said linkage retracting during continued bodily forward movement of the foot pedal, said linkage including cam rails for guiding the pedal for such continued forward movement, initial forward movement of the pedal connecting it to the brake control and pushing movement of the pedal operating the brake control.

2. In a motor vehicle having brake and throttle controls, an expansible and retractable linkage assembly mounted on the foot board of the vehicle to extend rearwardly therefrom, a foot pedal, means effective when said linkage is extended to fulcrum said foot pedal thereon for swing for operation of the throttle control and to disconnect said pedal from the brake control, means effective upon a preliminary bodily forward movement of the pedal for preventing operative engagement of the pedal with the throttle control and for bringing said pedal into position for operation thereby of the brake control by the continued forward bodily movement of the pedal, said linkage being retracted to follow such continued forward bodily movement of the pedal and forming a track therefor, and means effective during retraction movement of said linkage for holding said throttle control in throttle closing position.

3. In a motor vehicle having brake and throttle controls, an extensible and retractable linkage assembly mounted on the foot board of the vehicle, a foot pedal on said linkage assembly for operating said controls, means effective when said linkage is in extended position for fulcruming the foot pedal thereon for swing of the pedal for engagement with the throttle control for operation thereof and to disconnect said pedal from the brake control, means effective during swing of said pedal for throttle control for locking the brake control against operation by said pedal, means effective after a preliminary comparatively short bodily forward movement of said pedal for unlocking the brake control and for connecting said pedal to the brake control for operation by continued bodily forward movement of the pedal, said linkage during such continued forward movement of the pedal being retracted and forming a guide for the continued forward movement of the pedal.

4. In a motor vehicle having brake and throttle controls, an extensible and retractable linkage assembly mounted on the foot board of the vehicle, a foot pedal on said linkage assembly for operating said controls and normally disconnected from the brake control, means effective when said linkage is in extended position for fulcruming the foot pedal thereon for swing of the pedal for engagement with the throttle control for operation thereof, means effective during swing of said pedal for throttle control for locking the brake control against operation by said pedal, means effective after a preliminary comparatively short bodily forward movement of said pedal for connecting said pedal to the brake control and for unlocking the brake control for operation by continued bodily forward movement of the pedal, said linkage during such continued forward movement of the pedal being retracted and forming a guide for the continued forward movement of the pedal, and means effective during the brake control operation by the bodily forward movement of said pedal for preventing swing of said pedal.

5. In an automotive vehicle, a foot pedal, a supporting linkage for said foot pedal fulcrumed on the vehicle foot board and comprising rail plates fulcrumed at their forward ends to the vehicle foot board and support levers fulcrumed at their lower ends on the vehicle foot board for normally holding said rail plates in rearwardly extending position, guide members on said support levers and a brake lever connected with said guide members, a throttle control lever fulcrumed intermediate its ends on one of said supporting levers and having a connection from its lower end to a throttle valve and having its upper end opposed to the upper end of the foot pedal, said foot pedal being normally disconnected from said guide members and having fulcrum support on the rear ends of said rail plates for swing of the pedal for engagement with and swing of the throttle control lever for throttle operation, means whereby upon initial bodily forward movement of said foot pedal said foot pedal will be disconnected from said throttle control lever and will be brought into engagement with said guide members, means whereby continued bodily forward movement of said foot pedal will bodily move said guide members and swing said supporting levers forwardly for operation of the brake lever, and rollers on said foot pedal and said support levers engaging with said rail plates for guiding the continued bodily forward movement of the pedal.

6. In an automotive vehicle, a foot pedal, a supporting linkage for said foot pedal fulcrumed on the vehicle foot board and comprising rail plates fulcrumed at their forward ends to the vehicle foot board and support levers fulcrumed at their lower ends on the vehicle foot board for normally holding said rail plates in rearwardly extending position, guide members on said support levers and a brake lever connected with said guide members, a throttle control lever fulcrumed intermediate its ends on one of said supporting levers and having a connection from its lower end to a throttle valve and having its upper end opposed to the upper end of the foot pedal, said foot pedal being normally disconnected from said guide members and having fulcrum support on the rear ends of said rail plates for swing of the pedal for engagement with and swing of the throttle control lever for throttle operation, means whereby upon initial bodily forward movement of said foot pedal said foot pedal will be disconnected from said throttle control lever and will be brought into engagement with said guide members, means whereby continued bodily forward movement of said foot pedal will bodily move said guide members and swing said supporting levers forwardly for operation of the brake lever, rollers on said foot pedal and said support levers engaging with said rail plates for guiding the continued bodily forward movement of the pedal, and means whereby the point of connection of the lower end of the throttle control lever with the throttle valve will be brought into alignment with the fulcrum of said supporting levers whereby during forward swing of said supporting levers for brake operation the movement of said throttle control lever with said supporting levers will be ineffective to open the throttle.

7. A combined throttle and brake control structure for automotive vehicles comprising a support structure including a supporting lever fulcrumed at its lower end on the vehicle foot board and a rail plate supported by said supporting lever, a throttle control lever fulcrumed intermediate its ends on said supporting lever for connection at its lower end with a throttle, a brake lever, a foot pedal normally disconnected from the brake lever and fulcrumed on said rail plate for swing for engagement with the upper end of the throttle lever for control thereby of the throttle, means whereby an initial bodily forward movement of the foot pedal will bring it into operative engagement with the brake lever but will disconnect it from the throttle lever and will prevent swing thereof, said rail plate forming a support for the foot pedal for continued bodily forward movement thereof for operation of the brake lever and forward swing of said supporting lever and bodily movement of the throttle lever with the supporting lever, and means for holding the lower end of the throttle lever in the fulcrum axis of said supporting lever whereby the throttle will remain closed during the continued bodily movement of the foot pedal and brake operation thereby.

8. In a foot control device, a movable pedal, linkage supporting said pedal, a lever pivoted to said linkage and adapted for connection to a part to be actuated and positioned to be rocked in one direction by engagement therewith of the pedal when it is rocked in one direction, a spring connected between said lever and a fixed support for rocking said lever and said pedal in the opposite direction when foot pressure on the pedal is released, a second lever adapted to actuate another part and having a terminal portion adjacent said pedal and normally disconnected from said pedal, means on said pedal engageable with said portion of said second lever when the pedal is moved endwise in one direction, the said spring normally maintaining said last means and said second lever out of engagement, the endwise movement of said pedal to engage said second lever disabling actuation of said first lever by said pedal, said pedal being movable by push action to actuate said second lever, the said linkage retracting as the pedal is pushed, the retraction of the linkage carrying asid first lever with it while in disabled position, and a spring connected to said second lever to extend the linkage when push pressure is released from said pedal.

NELSON I. PERRY.